United States Patent
Karr et al.

(10) Patent No.: US 9,577,804 B2
(45) Date of Patent: Feb. 21, 2017

(54) SPECTRUM ALLOCATION SYSTEM AND METHOD FOR MULTI-BAND WIRELESS RF DATA COMMUNICATIONS

(71) Applicant: NETGEAR, Inc., San Jose, CA (US)

(72) Inventors: Randy J. Karr, Maple Valley, WA (US); Jean-Francois Grenon, Seattle, WA (US); Frank D. Cole, Bothell, WA (US)

(73) Assignee: NETGEAR, Inc., San Jose, CA (US)

( * ) Notice: Subject to any disclaimer, the term of this patent is extended or adjusted under 35 U.S.C. 154(b) by 0 days.

(21) Appl. No.: 14/270,039

(22) Filed: May 5, 2014

(65) Prior Publication Data

US 2014/0233440 A1    Aug. 21, 2014

Related U.S. Application Data

(63) Continuation of application No. 13/047,647, filed on Mar. 14, 2011, now Pat. No. 8,743,803, which is a continuation of application No. 10/095,307, filed on Mar. 11, 2002, now Pat. No. 7,936,714.

(51) Int. Cl.
| | |
|---|---|
| *H04Q 7/00* | (2006.01) |
| *H04L 5/00* | (2006.01) |
| *H04W 72/08* | (2009.01) |
| *H04W 76/02* | (2009.01) |
| *H04B 1/00* | (2006.01) |

(52) U.S. Cl.
CPC ........... *H04L 5/0048* (2013.01); *H04B 1/0057* (2013.01); *H04W 72/082* (2013.01); *H04W 76/02* (2013.01)

(58) Field of Classification Search
CPC .............................. H04W 76/02; H04W 76/04
USPC ................. 370/329, 332, 341, 349, 395.21, 370/276–282, 295, 310, 343
See application file for complete search history.

(56) References Cited

U.S. PATENT DOCUMENTS

| | | |
|---|---|---|
| 4,837,531 A | 6/1989 | Gourlain et al. |
| 5,041,840 A | 8/1991 | Cipolla et al. |
| 5,168,459 A | 12/1992 | Hiller |
| 5,475,677 A | 12/1995 | Arnold et al. |
| 5,694,414 A * | 12/1997 | Smith et al. .................. 375/130 |
| 5,708,440 A | 1/1998 | Trimble et al. |
| 5,815,804 A | 9/1998 | Newell et al. |
| 5,828,948 A | 10/1998 | Almgren et al. |
| 5,852,767 A | 12/1998 | Sugita |
| 5,915,212 A * | 6/1999 | Przelomiec et al. ............ 455/83 |
| 6,069,586 A | 5/2000 | Karlsson et al. |
| 6,191,666 B1 | 2/2001 | Sheen |

(Continued)

OTHER PUBLICATIONS

Anderson, "Rectangular and ridge waveguide," IRE, Sep. 1956, pp. 201-209.

*Primary Examiner* — Dmitry H Levitan
(74) *Attorney, Agent, or Firm* — Norton Rose Fulbright US LLP

(57) ABSTRACT

A dual band spectrum allocation system and method for wireless data communications uses discrete bands for upstream and downstream data communications. A preferred embodiment uses unlicensed UNII bands for license-free data transmissions from a subscriber to a hub, and uses relatively interference free licensed bands for data transmissions from a hub to subscribers, thereby allowing use of greater bandwidth, simplifying system licensing and reducing filtering requirements for subscribers.

22 Claims, 2 Drawing Sheets

(56) References Cited

U.S. PATENT DOCUMENTS

| | | | |
|---|---|---|---|
| 6,212,172 | B1 | 4/2001 | Barabash et al. |
| 6,380,823 | B1 | 4/2002 | Ikata et al. |
| 6,389,059 | B1 | 5/2002 | Smith et al. |
| 6,404,300 | B2 | 6/2002 | Ishida |
| 6,587,444 | B1 | 7/2003 | Lenzo et al. |
| 6,686,886 | B2 | 2/2004 | Flint et al. |
| 6,766,149 | B1 | 7/2004 | Hikita et al. |
| 6,801,519 | B1 | 10/2004 | Mangal |
| 6,816,124 | B2 | 11/2004 | Tillery |
| 6,922,559 | B2 * | 7/2005 | Mohammed .................. 455/421 |
| 7,512,094 | B1 * | 3/2009 | Linebarger et al. .......... 370/329 |
| 2002/0090974 | A1 | 7/2002 | Hagn |
| 2002/0132590 | A1 | 9/2002 | Marshall |
| 2003/0054763 | A1 | 3/2003 | Judd et al. |

\* cited by examiner

SPECTRUM ALLOCATION SYSTEM AND METHOD FOR MULTI-BAND WIRELESS RF DATA COMMUNICATIONS

CROSS-REFERENCE TO RELATED APPLICATIONS

This application is a continuation of U.S. patent application Ser. No. 13/047,647, filed Mar. 14, 2011 and entitled, "SPECTRUM ALLOCATION SYSTEM AND METHOD FOR MULTI-BAND WIRELESS RF DATA COMMUNICATIONS," which is a continuation of U.S. patent application Ser. No. 10/095,307, filed Mar. 11, 2002 and issued May 3, 2011 as U.S. Pat. No. 7,936,714, entitled, "SPECTRUM ALLOCATION SYSTEM AND METHOD FOR MULTI-BAND WIRELESS RF DATA COMMUNICATIONS," the disclosures of which are incorporated herein in their entirety.

TECHNICAL FIELD

The present invention generally relates to wireless RF data communications, and specifically to spectrum allocation systems and methods for multi-band wireless RF data communications.

BACKGROUND OF THE INVENTION

Currently, there are several so-called "last mile" and "last foot" data transmission systems which are designed to deliver high speed and/or high data capacity from the internet backbone to an end user or to provide high speed data communications in a campus-like setting. Several such systems use RF transmissions to replace copper wire or fiber optic cables. Some of these fixed wireless data communications systems are called point-to-point or point-to-multi-point systems and operate in various licensed and unlicensed RF bands. Point-to-point systems, typically have a pair of transceivers communicating only with each other, for example from one building to another. Point to multi-point systems communicate between a hub station, or the like and a number of subscriber stations, or the like. For example, such a point to multi-point system may broadcast from a central tall building to a number of shorter buildings.

Typically either of these systems utilize one frequency band of operation, generally, transmitting and receiving on separate frequencies within the same basic band employing frequency division duplexing (FDD). Such prior art data communication systems operate entirely within one regulated band. These prior art systems employ a subchannel scheme for upstream and downstream in which the frequencies of such subchannels are relatively closely spaced. That adjacency requires extensive use of filters resulting in increased size and cost for data communication systems, particularly for subscriber stations. The band utilized for communication in such prior art systems may be a licensed band or it may be an unlicensed band. Generally, as employed herein, unless otherwise noted, a band is a generally contiguous portion of the electromagnetic spectrum which is regulated by a governmental entity, such as the Federal Communications Commission (FCC) for the United States, generally under a single designation such as those described below.

Another technique which is used to enable communications within a band of operation is time division duplexing (TDD), whereby a base station or hub transmits part of the time on a frequency, and then a subscriber transmits part of the time on the same frequency, thereby sharing the same frequency. Such a system may employ the entire bandwidth available facilitating broadband communications rather than splitting the available bandwidth between upstream and downstream signals as is required in FDD. A disadvantage in a TDD system is that a large amount of coordination is required, resulting in inefficiencies. The bits-per-megahertz efficiency of the data communicated in a TDD system is greatly degraded because time sharing takes a lot of coordination and/or processing power. Further, units in a TDD system are typically not able to operate autonomously, they must be directed from a central unit such as a hub station in order to provide the aforementioned coordination.

In FDD, a base station may simultaneously transmit and receive, and a subscriber station may simultaneously transmit and receive. This provides a benefit in efficiency with this type of system in that the system does not require a lot of processing power or coordination to determine when to transmit and when to receive as with TDD. This inherent efficiency in an FDD system makes good use of spectrum in wireless data communications when larger amounts of spectrum are available. However, the upstream and downstream communications frequencies are typically in the same regulated band. FDD typically needs a reasonable amount, about one percent of bandwidth, of transmission to reception spacing between upstream and downstream frequencies.

In the prior art, the radio of a hub-station or subscriber station may include a duplexer, which employs filters to filter the upstream out of the downstream, and vice versa. In prior art data communications transceivers, a transmitted signal, and even transmit induced noise can enter the transceiver's receiver, because the receiver is intended to receive a very weak signal. So in the prior art very sophisticated filter systems are required to keep the transmit signal or interference caused by the transmit signal out of the receiver.

The Multichannel Multipoint Distribution Service (MMDS) is an FCC regulated communications band that operates in the microwave portion of the radio spectrum, between 2.1 and 2.7 GHz. MMDS. Also known as wireless cable, this band was initially intended for use as a substitute for conventional coaxial cable television. However, the MMDS band has come under wide use for data communication services due to deregulation that allows cable TV companies to provide Internet services. Narrowband channels within MMDS can be used by subscribers to transmit signals to the network. Such narrowband channels were originally intended for use in an educational setting (so-called wireless classrooms). Thusly, the Instructional Television Fixed Service (ITFS) band interleaves with the MMDS band. In ITFS, the FCC allows use of either polarity for transmissions by a license-holder, while in MMDS use of the same spectrum, the FCC requires licensing of the polarity as well as the frequency used for transmission.

Other FCC licensed and regulated bands include the following. Wireless Communications Services (WCS) occupy two fifteen MHz wide bands at 2.3 GHz. WCS is intended for wireless data services. Digital Electronic Message Services (DEMS) at the 24.25 to 24.45 and 25.05 to 25.25 GHz bands offer high data capacity over short distances, particularly useful for providing broadband data services to businesses in dense, urban areas or in a campus environment. Local Multipoint Distribution Services (LMDS) employ the 27.5 to 29.5 GHz and 31.0 to 31.3 GHz bands. Wireless Local Loop and fixed wireless data connection systems such as point-to-point or point-to-consecutive point systems operate in these bands. So called Fixed Wireless Local Loop Services occupy the 38.6 GHz to 40 GHz band.

Problematically, there are only a limited number of licensed bands in any geographic area. Also, in these licensed spectrum bands, limited spectrum problems arise where the licensee may not have as much bandwidth in a particular market as needed to provide broadband services desired by the licensee's customers. Also, problems arise where a licensee has spectrum, but this spectrum is not ideal in terms of a transmit/receive frequency pair. For example, certain amount of spectrum, as a percentage of bandwidth, between the upstream and the downstream (i.e. transmit and receive frequencies) is required to allow state of the art filters to properly operate. Many spectrum licensees do not have sufficient spectrum bandwidth available to provide this separation between employed frequencies.

In 1997 the FCC created a wireless arena called Unlicensed National Information Infrastructure (UNII). System operators are free to operate wireless equipment in three sub-bands (5.15 to 5.25 GHz, 5.25 to 5.35 GHz and 5.725 to 5.825 GHz) without acquiring a licensed frequency spectrum. The FCC specifies the conditions for operating wireless equipment in the UNII frequency band. However, operators are not protected from possible interference from other UNII operators transmitting in the vicinity or even other systems or devices which utilize the same frequencies.

A problem that many wireless data communication system operators face is a need to provide the highest possible data rates to subscriber units. One prior art method of providing greater through-put in licensed bands is to have a very large channel bandwidth providing data to the subscriber. To increase through-put to a particular subscriber unit, the bandwidth must necessarily increase or the modulation scheme that is used has to become more complicated. Problematically, bandwidth is limited in both the licensed and unlicensed bands and using a higher modulation scheme causes an increase in the necessary signal to noise ratio or carrier to interference ratio (C/I). For example, increasing from a quadrature phase shift keying (QPSK) modulation to a 16 quadrature-amplitude modulation (16QAM), which doubles the throughput, requires a 6 dB increase in C/I. Problematically, such increases in C/I may not be practical, particularly in the unlicensed bands where a significant amount of interference may be present.

BRIEF SUMMARY OF THE INVENTION

The present invention is directed to systems and methods for providing wireless data transmission spectrum allocation by utilizing separate bands for upstream and downstream wireless data communication. In a preferred embodiment the present invention takes the form of a dual band spectrum allocation system and method for wireless data communications using unlicensed UNII bands for license-free data transmissions from a subscriber to a hub, and using relatively interference-free licensed bands for data transmissions from a hub to subscribers, thereby allowing use of greater bandwidth.

The present invention enables the use of wireless spectrum for digital data communication, such as Internet access or other connections such as Ethernet, between points such as campus building's or the like. The present invention is intended to enable use of spectrum that is not otherwise useable for high data rate communication and enables use of limited spectrum where there is not enough bandwidth available to a licensee to transmit the amount of data that is required by the licensee or its customers. As pointed out above, continuous spectrum, which provides sufficient bandwidth for a proper data rate to be passed by a wireless data communications system, is somewhat rare or at least difficult and costly to acquire. The present invention provides a solution for licensees with spectrum congestion and spectrum limitation problems.

The present invention allows an operator to use any band to which the operator has access. If the operator has licenses in more than one band the present invention allows the operator to make efficient use of these licenses. Similarly, if an operator has a license in only one band, the operator can enhance use of the available spectrum in the licensed band by employing unlicensed bands, such as the UNII bands for one direction of communication in accordance with the present invention. For example, a licensee may employ its relatively interference-free licensed spectrum bandwidth for high speed, relatively broadband, transmissions from a hub station to subscriber stations while employing an unlicensed band such as the 5.8 GHz band of the UNII bands for communications from subscribers to the hub. This UNII upper band is 100 megahertz wide and is sparsely used. In most markets there are relatively few or no transmissions in this band.

Generally, Internet or other network traffic is asymmetric, that is to say, there is more traffic coming from the network to subscribers than from subscribers to the network. Therefore, in the present system and method the less noisy licensed band frequency is preferably used to transmit data downstream from the hub to the subscriber while the noisier unlicensed band frequency is preferably used to transmit upstream data from a subscriber to the hub. However, one embodiment of the present system and method, by employing the relatively underused unlicensed band at 5.8 GHz, is adaptable to allow relatively high capacity data transmissions from a subscriber to the hub, as necessary.

By utilizing separate bands, particularly bands separated by an octave or more, the present invention increases the efficiency and capacity of a wireless data communication system by allowing use of the full bandwidth available, in each band, to an operator. As used herein, a frequency octave is a doubling of frequencies. In other words, an octave is an interval between two frequencies having a ratio of two-to-one. For example, a downstream transmission made on a one GHz frequency would be separated by one octave from an upstream transmission made on a two GHz frequency. Prior art wireless RF data communication systems do not use over one octave of separation between transmit and receive frequencies. Generally, this would require the use of spectrum from separate bands. Typically, in the prior art, FDD frequency separation is less than one percent of frequency. For example prior art FDD transmission frequencies at around one GHz would traditionally be separated by less than ten MHz The present invention allows spectrum, which does not have sufficient bandwidth to provide one percent frequency separation between upstream and downstream frequencies, as typically required to use FDD, to be used for broadband data transmission. The present system and method preferably qualifies a geographical area which may not have been optimal based on its available line of sight and licensee's spectrum bandwidth for relatively broadband data communications.

The present inventive point to multi-point radio transmission system is intended to transmit data from one point to multiple points via wireless digital radio, preferably from a base or hub station to a number of subscriber stations, with efficient use of spectrum and at as low a cost as possible. This efficiency is particularly enhanced in a point to multipoint system due to sharing of the cost for hub equipment and site or building top, as well as sharing hub operating expenses such as electricity, among multiple subscribers.

Whereas the present invention uses separate bands of operation to carry out upstream and downstream data transmission, the present invention necessarily addresses some distinctive technical problems. A hub and subscriber stations embodying the present invention each preferably employs a multi-band antenna, preferably capable of employing multiple polarities in all bands. Preferably, this antenna is a dual band antenna capable of employ two orthogonal polarities such as horizontal and vertical polarities in both bands. This dual band antenna preferably employs relatively the same gain and footprint for the antenna beams of both bands. Preferably, the forward gain, beam width and the reverse side lobe isolation for the antenna beams are similar so that the footprint for the upstream beam is similar to the footprint for the downstream beam, even though the bands of operation are separated by an octave.

An embodiment of the present invention also preferably employs a dual band duplexer. Such a duplexer may be made up of, by way of example, discrete circuit components, an integrated circuit or a rectangular waveguide assembly. A waveguide based dual band duplexer preferably employs two different size waveguide components, on the order of a factor of two. Preferably, the duplexer provides low insertion loss while low in cost and having a small package size.

Embodiments of the present invention preferably use very diverse portions of spectrum for upstream and downstream data communication, this addresses some of the spectrum limitations and the congestion problems detailed above. Further, the present invention enables the efficient use of the spectrum because it prevents interference between transmit and receive signals without requiring exotic filters. The present dual band approach overcomes the forestated problem of a transmitted signal, or noise induced thereby, entering a transceiver's receiver, because as bands are further separated in the electromagnetic (EM) spectrum, the transmitter and receiver of a transceiver do not interfere with one another. In accordance with the present invention, transmit and receive signals occupy different parts or bands of the EM spectrum, preferably separated by at least an octave of frequency. So preferably need for filtering is greatly reduced. As a result of filtering being reduced, the present invention enables the size of a data communications device to be reduced and the cost of the device to be reduced.

When employing two separate bands, filtering requirements for one band may be greater than the filtering requirements for the other band. This may be due to one frequency of operation being widely used, for similar and/or different purposes, or an adjacent frequency band that has tight regulatory specifications. For example, some bands, such as WCS, have an adjacent band, such as Digital Audio Radio Satellite (DARS), that have more stringent rules, in this example due to WCS being a terrestrial band and DARS being a satellite band. By using a relatively noisier band, such as the UNII band, for upstream transmissions, a preferred embodiment of the present invention enables an operator to use the more expensive and complicated filter in the base station, and the less expensive, smaller filters in subscriber stations. This is economically advantageous in a point to multi-point system since only one large, expensive filter is needed at the base station.

The present invention has great advantages related to frequency coordination and licensing. Typically in a point to multi-point system, a service provider is required to coordinate a base station so it does not interfere with or is received by subscribers in adjacent markets. Additionally, in prior art licensed spectrum data communication systems each of the subscriber stations must be included in an interference study. Typically, the maximum ground elevation of the highest subscriber in a given sector is used in conjunction with power addition of all of the subscribers in the system, transmitting at the same time, to analyze interference to any adjacent market. In accordance with a preferred embodiment of the present system, subscribers transmit on an unlicensed band and thus can transmit without benefit of a license. So, a service provider employing the present system and method does not need to make a frequency coordination study for all of the subscriber area. Preferably, use of a licensed band by a hub station for downstream transmissions affords a degree of protection from interference by other systems. Therefore, a provider employing the present system and method should only be required to perform frequency coordination for the base station. A related advantage is that as subscribers are added, a provider should not need to refine its frequency plan.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

The present systems and methods for multi-band wireless RF data communications enables communication of upstream data on one band of operation while downstream data is communicated on a different band of operation. These bands are preferably separated by more than one percent bandwidth and in a preferred embodiment are separated by at least one octave of bandwidth. Specifically one preferred embodiment of the present invention utilizes one regulated band for downstream communications such as from a hub station to subscriber stations and an entirely different regulated band for communication in the other direction, these bands preferably employ a magnitude of separation, thereby minimizing filtering problems and as a result minimizing size and cost of communication stations. The two bands may both be licensed bands or both may be unlicensed bands. However, in one preferred embodiment, one band is a licensed band while another is an unlicensed band.

Figure 1:
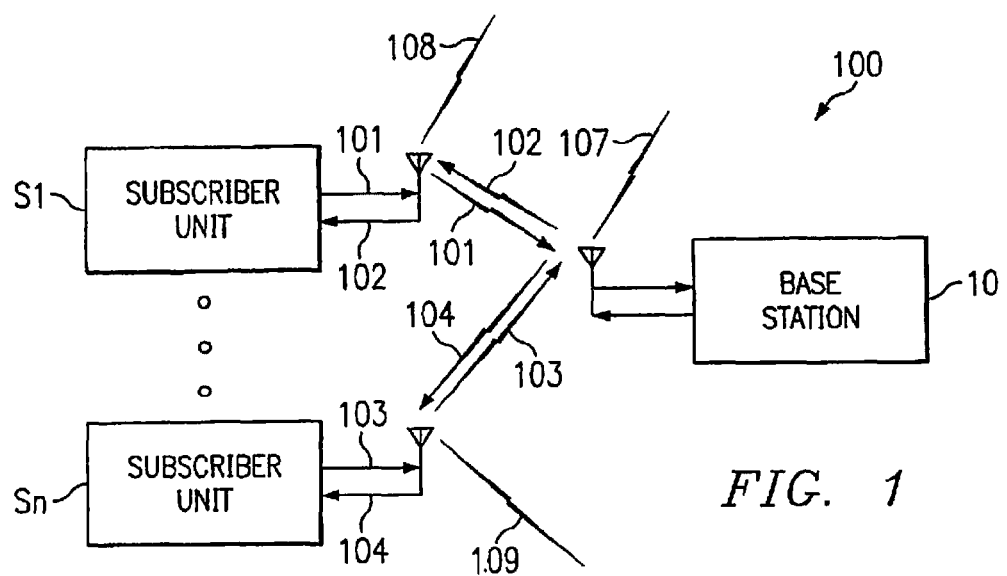
FIG. 1 is a diagrammatic illustration of a wireless data communication system employing the present spectrum allocation system and method for multi-band wireless RF data communications.

FIG. 1 is a diagrammatic illustration of a point to multipoint data communications system 100 employing an embodiment of the present spectrum allocation system and method for multi-band wireless RF data communications. FIG. 1 shows base station 10 in wireless data communication with multiple subscriber systems S1 to Sn. In accordance with the present system and method any number of subscribers S1 to Sn may be present. The present system and method employ downstream (i.e. from the hub to subscribers) wireless data transmissions 102 and 104 in at least one band of operation, preferably a relatively interference-free licensed band such as MMDS, ITFC or WCS while transmissions 101 and 103 in the upstream direction (i.e. from subscriber to the hub) take place in at least one license-free band, such as the UNII bands. The bands of operation for the present invention are preferably separated by more than the normal degree of separation between upstream and downstream frequencies as employed in prior art FDD. Preferably, the frequencies of operation for upstream transmissions 101 and 103 and the frequencies of operation for downstream transmissions 102 and 104 are in separate bands of operation, preferably regulated bands. Compensation for interference 107 with reception of upstream communications is preferably carried out by a single filter at hub station 10, while interference 108 and 109 with reception of the relatively high data-volume downstream transmissions is relatively minor due to the preferable employment of a relatively interference-free licensed band. This allows the aforementioned use of a single expensive and/or complicated filter at the base station, and the use of less expensive, smaller filters in subscriber stations.

Figure 2:
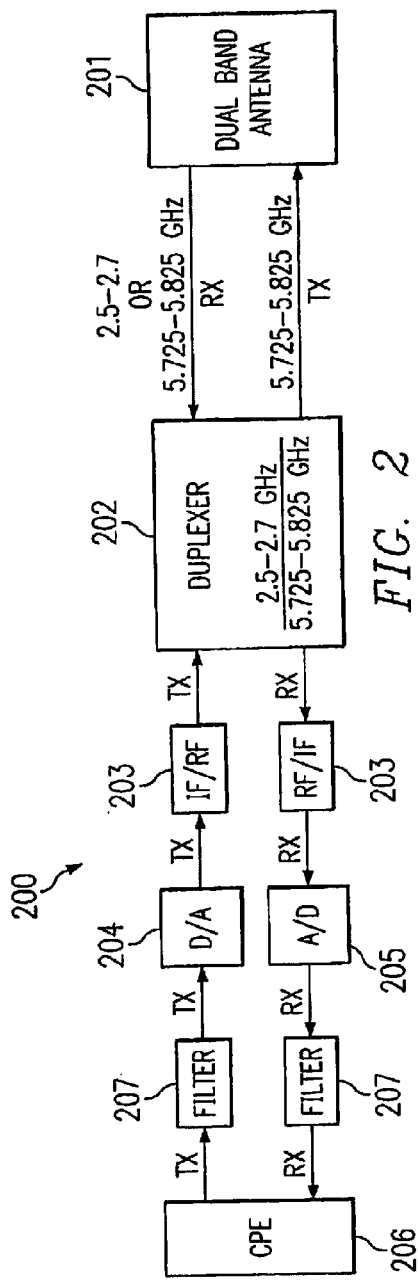
FIG. 2 is a diagrammatic illustration of an embodiment of a subscriber station employing dual band wireless data communication in accordance with the present invention.

The present systems and methods preferably employ dual band antennas, and dual band duplexers in both types of stations, hub station 10 and subscriber stations S1 to Sn. Referring to FIG. 2, an embodiment of subscriber unit 200 uses multi-band antenna 201, preferably capable of employing multiple polarities in all bands. Preferably, antenna 201 is a dual band antenna also capable of employing two orthogonal polarities such as horizontal and vertical polarities. Dual band antenna 201, as discussed previously, preferably normalizes the gain of the two bands. Dual band antenna 201 preferably matches the antenna patterns preferably by matching the pattern beam width, side lobes and front to back footprint as much as possible, so the footprint of operation matches in the upstream and the downstream direction as much as possible, even though the bands of operation are preferably separated by an octave. Alternatively, separate antenna beams for upstream and downstream data communications may be employed to avoid multipath effects or the like and/or to facilitate non-line-of-sight communications. Regardless, the present invention preferably utilizes an antenna that fits packaging requirements for subscriber stations (i.e. compact size for use in a subscribers available space) while operating in both bands.

Preferably subscriber station 200 employs a multi-band duplexer 202. Duplexer 202 preferably accommodates upstream and downstream communications on at least two greatly different bands of operation. A preferred embodiment duplexer 202 operates in two separate bands of operation, as opposed to transmitting and receiving on frequencies within the same band of operation, as with prior art duplexers. Duplexer 202 may be made up of discrete circuit components, may be embodied in an integrated circuit, may comprise a rectangular waveguide assembly or may be made up of other combinations of components and elements capable of carrying out duplexing in accordance with the present invention. A waveguide based dual band duplexer employs two different size waveguide components. For a preferred duplexer using frequencies in bands separated by an octave, the waveguide size difference is on the order of a factor of two. Preferably, the duplexer provides low insertion loss while being low in cost and having a small package size. Less expensive duplexers 202, which may have integrated filters with fewer poles, may be employed in subscriber stations 200, when compared to a hub station, thereby lowering the cost of subscriber stations 200, making the overall system less expensive.

Subscriber station 200 preferably employs intermediate frequency (IF) converters 203 (preferably employing heterodyne techniques), digital to analog (D/A) processing circuits 204 and analog to digital (A/D) processing circuits 205. Preferably, incoming signals are converted from an analog RF signal to a digital signal for use by customer premises equipment (CPE) 206, which may include further networking equipment serving multiple users. Preferably, received signals are broken into their MAC layer and PHY layer components for use by conventional networking protocols such as Ethernet to communicate with CPE 206. For transmitting, signals originate from CPE 206 as a digital Ethernet signal or the like and are converted to an RF signal for transmission. The signal is imposed on a carrier signal, preferably produced by a voltage controlled oscillator, or the like (not shown). Preferably the output signal is passed through a power amplifier set (not shown), which directly drives antenna output.

Filtering to allow dual band operation is largely handled within duplexer 202. However, additional filters 207 associated with the aforementioned IF circuitry, specifically digital filtering, known as finite impulse response (FIR) filtering, and also discrete filtering such as surface acoustical wave (SAW) filtering, may be carried out by RF filters 207 before and/or after D/A and A/D conversion. Whereas, in accordance with the present invention, a band with less interference and thus less filtering requirements is used to transmit from the hub to subscriber station 200, the subscriber station preferably need not make extensive use of filtering or may only employ less costly filters for reception.

Figure 3:
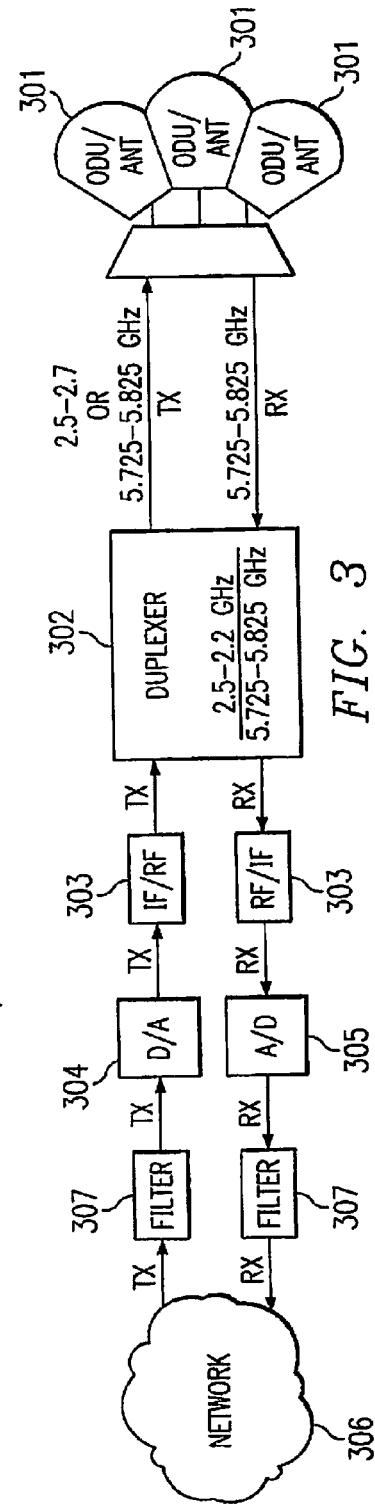
FIG. 3 is a diagrammatic illustration of an embodiment of a hub station employing dual band wireless data communication in accordance with the present invention.

Turning to FIG. 3, although the architecture of base station 300 is somewhat similar to that of subscriber station 200, technical challenges specific to a base station 300 arise. Preferably, hub 300 employs a multi-lobe antenna assembly with each lobe comprising a dual band antenna 301. Similar to subscriber station, 200, the pattern of dual band antenna 301, the side lobes, gain and front to back ratio of antenna beams for the two different bands employed by the hub for transmitting and receiving are preferably matched as close as possible to the same gain and pattern of the complimentary subscriber station antenna beam patterns. In short, the footprint of a reception antenna beam pattern preferably approximates the footprint for a transmission antenna beam pattern for both hub antenna 301 and subscriber station antenna 201, such that the beam patters for both stations are substantially co-spatial. Alternatively, separate antenna beams for communications from and to hub 300 may be employed to facilitate non-line-of-sight communication and/or to avoid multipath effects, or the like.

Hub duplexer 302 of preferred embodiment hub 300 is also a multi-band duplexer enabling use of at least two different transmit and receive bands. However, base station 300 may utilize a more elaborate duplexer 302, e.g. having a greater number of poles, while maintaining low insertion loss. A preferred embodiment of duplexer 302 operates in separate bands of operation, as opposed to prior art duplexers which transmit and receive on frequencies within a single band of operation. Embodiments of duplexer 302 may be made up of discrete circuit components, may comprise an integrated circuit or may employ a rectangular waveguide assembly which may be made up of two or more different size waveguide components. Preferably, duplexer 302 provides low insertion loss, is low in cost and is compactly packaged. Additionally, more elaborate filtering is preferably used in conjunction with base station dual band duplexer 302.

Similar to subscriber station 200, an embodiment of hub 300 employs IF circuitry 303 using heterodyne techniques, A/D converters 305, and D/A converters 304 to enable communication via network 306. Network 306 may be the Internet backbone, an intranet, an Ethernet network for a campus or the like, a cable network, public switched telephone network (PSTN), a nationwide service network, or other public or private network. Preferably, incoming signals are converted from an analog RF signal to a digital signal employing A/D converter 305 for use by Network 306. Preferably, signals received by base station 300 are broken into their MAC layer and PHY layer components for use by conventional networking protocols such as Ethernet to communicate with Network 306. For transmitting, signals originating from Network 306 as digital signals are converted to RF signals for transmission by D/A converter circuitry 304 and IF/RF circuitry 303.

Filtering at the base station to allow dual band operation is also largely handled within duplexer 302. Additional filters 307 associated with the aforementioned IF circuitry, which may include digital FIR filtering and discrete SAW filtering may be carried out before and/or after D/A and A/D conversion. At base station 300, the present invention utilizes a reduced number of, or preferably a single, more complicated and expensive filter, which may have more poles or more selectivity and which may or may not be incorporated into duplexer 302. Because one base station is supporting multiple subscriber stations overall cost of the system is reduced, since a single more expensive filter is used at base station 300 while lower cost filters are used at multiple subscriber stations 200.

As will be appreciated by those skilled in the art functionality of various components in both subscriber station 200 and/or hub station 300 of the present system may be integrated into fewer, or even singular components. Conversely, components may be separated. For example, filters, described above as incorporated in duplexers 202 and 302, may be separate components deployed separately from or in conjunction with duplexers 202 and 302.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wireless communication subscriber device, the subscriber device comprising:
   a multi-band antenna configured to operate in at least a first frequency band and a second frequency band, wherein the multi-band antenna:
   transmits data to a base station on a first frequency in the first frequency band, the first frequency band being an unlicensed frequency band, and
   receives data from the base station on a second frequency in the second frequency band, the second frequency band being a licensed frequency band,
   wherein at least a portion of the receiving and at least a portion of the transmitting occurs during the same communication session with the base station.

2. The wireless communication subscriber device of claim 1 further comprising:
   a multi-band duplexer configured to operate in at least the first frequency band and the second frequency band.

3. The wireless communication subscriber device of claim 1 wherein the unlicensed frequency band is a 5 GHz frequency band.

4. The wireless communication subscriber device of claim 1 wherein the multi-band antenna:
   transmits data on a third frequency, the third frequency being in a second licensed band frequency band during the communication session.

5. A wireless communication method, the method comprising:
   transmitting to a base station, using a multi-band antenna configured to operate in at least a first frequency band and a second frequency band, data on a first frequency in the first frequency band, the first frequency band being an unlicensed frequency band, and
   receiving from the base station, using the multi-band antenna, data on a second frequency in the second frequency band, the second frequency band being a licensed frequency band,
   wherein at least a portion of the receiving and at least a portion of the transmitting occurs during the same communication session with the base station.

6. The wireless communication method of claim 5 further comprising:
   duplexing, using a multi-band duplexer, at least the first frequency in the first frequency band and the second frequency in the second frequency band.

7. The wireless communication method of claim 5 wherein the unlicensed frequency band is a 5 GHz frequency band.

8. The wireless communication method of claim 5 further comprising:

transmitting, using the multi-band antenna, data on a third frequency, the third frequency being in a second licensed band frequency band during the communication session.

9. A wireless communication base station, the base station comprising:
a multi-band antenna configured to operate in at least a first frequency band and a second frequency band, wherein the multi-band antenna:
receives data from a subscriber device on a first frequency in the first frequency band, the first frequency band being an unlicensed frequency band, and
transmits data to the subscriber device on a second frequency in the second frequency band, the second frequency band being a licensed frequency band,
wherein at least a portion of the receiving and at least a portion of the transmitting occurs during the same communication session with the subscriber device.

10. The wireless communication base station of claim 9 further comprising:
a multi-band duplexer configured to operate in at least the first frequency band and the second frequency band.

11. The wireless communication base station of claim 9 wherein the unlicensed frequency band is a 5 GHz frequency band.

12. The wireless communication base station of claim 9 wherein the multi-band antenna:
receives data on a third frequency, the third frequency being in a second licensed band frequency band during the same communication session.

13. A wireless communication method, the method comprising:
receiving from a subscriber device, using a multi-band antenna configured to operate in at least a first frequency band and a second frequency band, data on a first frequency in the first frequency band at a base station, the first frequency band being an unlicensed frequency band, and
transmitting to the subscriber device, using the multi-band antenna, data on a second frequency in the second frequency band from the base station, the second frequency band being a licensed frequency band,
wherein at least a portion of the receiving and at least a portion of the transmitting occurs during the same communication session with the subscriber device.

14. The wireless communication method of claim 13 further comprising:
duplexing, using a multi-band duplexer, at least the first frequency in the first frequency band and the second frequency in the second frequency band.

15. The wireless communication method of claim 13 wherein the unlicensed frequency band is a 5 GHz frequency band.

16. The wireless communication method of claim 13 further comprising:
receiving, using the multi-band antenna, data on a third frequency, the third frequency being in a second licensed band frequency band during the same communication session.

17. A data communications base station using spectrum allocation for wireless data communications, the base station comprising:
means for establishing separate co-spatial reception and transmission antenna beams, the beams employing disparate frequencies in different bands of operation to transmit and receive data signals, wherein at least a portion of the data signals are transmitted and received during the same communication session with a subscriber device;
means for duplexing the data signals received and transmitted on the disparate frequencies in the different bands of operation; and
means for filtering the data signals,
wherein the disparate frequencies are separated by a bandwidth of at least one percent of the lower of the disparate frequencies used to transmit and receive data signals.

18. The data communications base station of claim 17 wherein the disparate frequencies are separated by at least one octave.

19. The data communications base station of claim 17 wherein at least one of the disparate frequencies is in a licensed band.

20. The data communications base station of claim 19 wherein at least one of the disparate frequencies is in an unlicensed band.

21. The data communications base station of claim 20 wherein at least one unlicensed band frequency is used for upstream data communications.

22. The data communications base station of claim 21 wherein at least one licensed band frequency is used for downstream data communications.

* * * * *